United States Patent [19]
Jang

[11] Patent Number: 5,545,099
[45] Date of Patent: Aug. 13, 1996

[54] SHIFT CONTROL VALVE OF A HYDRAULIC CONTROL SYSTEM FOR AUTOMATIC TRANSMISSION

[75] Inventor: Jaeduk Jang, Kyungki-do, Rep. of Korea

[73] Assignee: Hyundai Motor Company, Seoul, Rep. of Korea

[21] Appl. No.: 343,498

[22] PCT Filed: Dec. 29, 1993

[86] PCT No.: PCT/KR93/00120

§ 371 Date: Nov. 29, 1994

§ 102(e) Date: Nov. 29, 1994

[87] PCT Pub. No.: WO95/18321

PCT Pub. Date: Jul. 6, 1995

[30] Foreign Application Priority Data

Jul. 27, 1992 [KR] Rep. of Korea .............. 92-13462

[51] Int. Cl.⁶ ............................................ F16H 61/26
[52] U.S. Cl. .................. 475/135; 477/127; 477/159; 137/625.23; 137/625.63
[58] Field of Search ............................. 477/159, 127, 477/130; 475/135, 122; 137/625.23, 625.63

[56] References Cited

U.S. PATENT DOCUMENTS

| | | | |
|---|---|---|---|
| 2,877,668 | 3/1959 | Kelbel | 475/135 |
| 3,075,410 | 1/1963 | Weinrich et al. | 475/135 |
| 3,359,833 | 12/1967 | Flinn | 475/135 |
| 3,733,927 | 5/1973 | Vozumi et al. | 477/127 |
| 4,726,261 | 2/1988 | Kato et al. | 477/127 |
| 5,249,476 | 10/1993 | Zaiser et al. | 74/335 |

FOREIGN PATENT DOCUMENTS

0510657 10/1992 European Pat. Off. .

*Primary Examiner*—Khoi Q. Ta
*Assistant Examiner*—Sherry Estremsky
*Attorney, Agent, or Firm*—Birch, Stewart, Kolasch & Birch, LLP

[57] ABSTRACT

A hydraulic control system for an automatic transmission, the system including: a fluid pump; a proportional control valve for reducing a hydraulic pressure in accordance with a vehicle speed; a valve body including a line pressure inlet port for receiving the hydraulic pressure compressed by a fluid pump, a line pressure outlet port for flowing out the hydraulic pressure to be used as a driving pressure in a "D" range; a reverse pressure port for flowing out the hydraulic pressure to be used as the driving pressure in an "R" range; and a first, a second, a third and a fourth speed ports for receiving the hydraulic pressure from the line pressure outlet port and for flowing out the hydraulic pressure to shift a speed stage in accordance with a vehicle speed; a manual valve rotatably disposed in the valve body and rotates in accordance with a movement of a shift lever; and a shift control valve rotatably disposed in a same concentric axis with said manual valve in the valve body; the manual valve including a neck portion, the neck portion integrally forming a first, a second and a third blades thereon for selectively supplying the line pressure to the line pressure inlet port, the line pressure outlet port, and the reverse pressure port.

7 Claims, 7 Drawing Sheets

SHIFT CONTROL VALVE OF A HYDRAULIC CONTROL SYSTEM FOR AUTOMATIC TRANSMISSION

BACKGROUND OF THE INVENTION

1. Field of the Invention

The present invention relates to a shift control valve of a hydraulic control system for automatic transmission, and more particularly to the shift valve which can provide a hydraulic control system for automatic transmission having a simple and compact construction by concentrically arranging a manual valve in a valve body, and ensures safety by maintaining a formal shifting operation when an electronic control system is out of order.

2. Description of Related Art

A conventional automatic transmission for a vehicle has a torque converter and a multiple stage transmission gear mechanism connected with the torque converter, which includes a hydraulically-actuated friction member for selecting one of a plurality of gear stages of the transmission gear mechanism in accordance with vehicle operating conditions.

A hydraulic control system pressurized by a fluid pump provides a working pressure required to operate the friction members and control valves.

The commonly-used automatic transmission for a vehicle has the torque converter which generally includes a pump impeller connected with an engine output shaft to be driven thereby, a turbine runner with an output shaft member, and a stator disposed between the pump impeller and the turbine runner, so that hydraulic fluid is circulated by the engine-driven pump impeller through the turbine runner with the aid of the stator which functions to deflect the hydraulic fluid from the turbine runner to a direction where fluid flow does not disturb a rotation of the pump impeller when fluid flows into the pump impeller.

An automatic shift is made by an operation of the friction members such as clutches or a kick-down brake at each shift change. Also, a manual valve, a port of which is converted by selecting a position of a selector lever, is designed to be supplied with a fluid pump and to supply the fluid to a shift control valve. In a 4-speed automatic transmission, the shift control valve has an opening port changed by an electronic control system.

Figure 6:
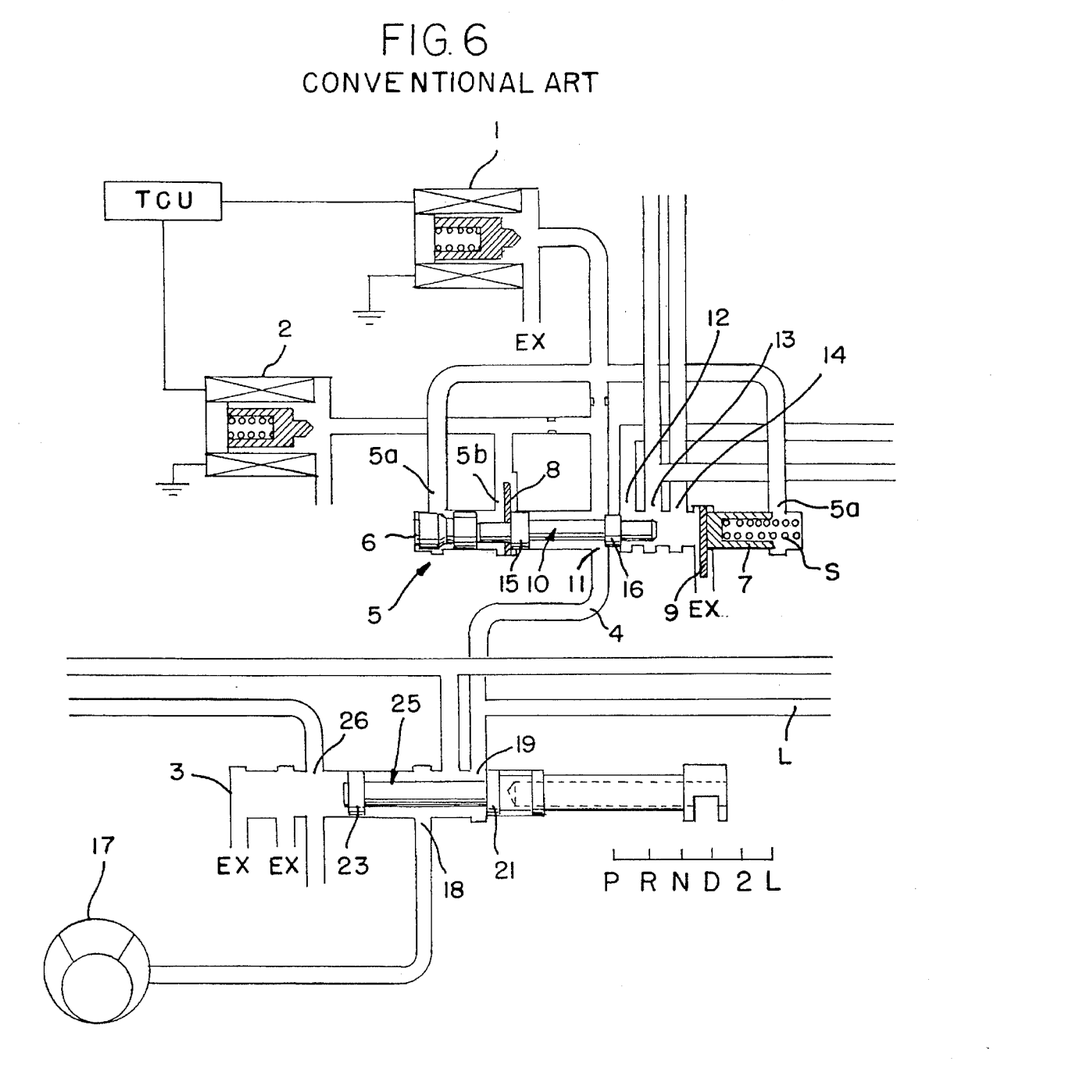
FIG. 6 is a side sectional view for depicting a connecting state of a conventional shift control valve and manual valve.

FIG. 6 is a side sectional view for depicting a connecting state of a conventional shift control valve and manual valve, where two shift control solenoid valves 1, 2, operated according to a signal of a transmission control unit TCU, are connected with a manual valve 3 via line 4, and a line pressure is regulated in accordance with an on/off operation of the shift control solenoid valves 1 and 2.

At this point, the regulated line pressure is designed to work on ports 5a, 5a', 5b of the shift control valve 5 to supply a hydraulic pressure to plugs 6,7 which is limited in its movement by stoppers 8,9.

A valve spool 10 is disposed between the stoppers 8,9 such that the hydraulic pressure supplied from an inlet port 11 formed on a valve body is selectively supplied to a first outlet port 12, a second outlet port 13 and a third outlet port 14.

To supply the hydraulic pressure selectively, the valve spool 10 includes a first land 15 and a second land 16 smaller than the first land 15. The first and second lands are limited in its movement by a first stopper 8 and a second stopper 9, respectively.

Further, the ports 5a, 5a' communicate with each other and are designed to supply the hydraulic pressure to the first and second plugs 6,7, respectively. The port 5b independently supplies the hydraulic pressure to the valve spool 10, and the plug 7 is elastically supported by a spring S thereby receiving a constant force which is to move toward the second stopper 9.

The manual valve 3 includes an inlet port 18 receiving the hydraulic pressure from a fluid pump 17, an outlet port 19 supplying the hydraulic pressure from the inlet port 18 to the inlet port 11 of the shift control valve 5 and a valve spool 25 which moves in accordance with a movement of a shift lever.

The valve spool 25 includes a land 21 for supplying the hydraulic pressure to the outlet port 19 when the shift lever is shifted to one position of "D" position, "2" position and "L" position and a land 23 for supplying the hydraulic pressure to a port 26 when the shift lever is shifted to an "R" position.

In the conventional hydraulic control system as described above, in a first speed stage of "D" range, since both of the shift control solenoid valves 1,2 are turned ON by the TCU, the hydraulic pressure generated from the fluid pump 17 flows into the inlet port 18 of the manual valve 3 and then flows into the inlet port 11 of the shift control valve 5 via the outlet port 19. However, since the hydraulic pressure is exhausted through an exhaust port Ex, the valve spool 10 moves leftward by the hydraulic pressure working on the first land 15.

That is, as shown FIG. 6 depicting a first speed stage of the "D" range, in the first speed stage of "D" range, a friction element is operated by the hydraulic pressure supplied through a line L diverged from the outlet port 11 of the manual valve 3.

Further, in a second speed stage of the "D" range, since the shift control solenoid valve 1 is turned OFF by the TCU, the hydraulic pressure does not work on the port 5b of the shift control valve 5 but works on the ports 5a, 5b.

Accordingly, the first and second plugs 6,7 move to and stop by the first and second stoppers 8 and 9.

At this point, the first plug 6 pushes the valve spool 10 which penetrates the first stopper 8, such that the second land 16 of the valve spool 10 moves to a right side of the first outlet port 12 whereby the first outlet port 12 communicates with the inlet port 11.

Accordingly, the hydraulic pressure generated from the fluid pump works on another friction element through the first outlet port 12 thereby realizing the second speed stage.

Further, in a third speed stage of the "D" range, both the solenoid valves 1,2 are turned OFF by the TCU so that the first and second outlet ports are opened. In a fourth speed stage of "D" range, the shift control solenoid valve 2 is turned OFF so that the first, second and third outlet ports are opened to supply the hydraulic pressure to each friction element thereby realizing the speed change.

However, in the above-described hydraulic pressure control system, since the manual valve and the shift control valve is separately disposed from each other, a problem that a space for equipping the valves needs occurs. Besides, since two shift control solenoid valves are used, there occurs another problem that control is complicated.

Additionally, when the electronic control system is out of order, since the two shift control solenoid valves are turned OFF, the third speed stage of "D" range is maintained, such that an engine brake effect can not be obtained thereby having a problem in safety.

SUMMARY OF THE INVENTION

It is an object of the present invention to provide a shift control valve of a hydraulic control system for an automatic transmission system, which is unified with a manual valve to provide a simple mechanism in a structure.

It is another object of the present invention to provide a shift control valve of a hydraulic control system for an automatic transmission system, which can manually shift first, second, third and fourth speed stages when an electronic control system is out of order.

To achieve the objects, the present invention provides a hydraulic control system for an automatic transmission, the system comprising: a fluid pump; a proportional control valve for reducing a hydraulic pressure in accordance with a vehicle speed; a valve body which comprises a line pressure inlet port for receiving a line pressure compressed by a fluid pump, a line pressure outlet port for flowing out the line pressure to be used as a driving pressure in a "D" range, a reverse pressure port for flowing out the line pressure to be used as the driving pressure in an "R" range, a first, a second, a third and a fourth speed ports for receiving the line pressure from the line pressure outlet port and for flowing out the line pressure to shift a speed stage in accordance with a vehicle speed; a manual valve rotatably disposed in the valve body and moved in accordance with a movement of a shift lever; and a shift control valve rotatably disposed in a same axis with said manual valve in the valve body; the manual valve including a neck portion, the neck portion forming a first, a second and a third blades thereon for selectively supplying the line pressure to the line pressure inlet port, the line pressure outlet port, and the reverse pressure port; the shift control valve including a first, a second and a third blades, elastic members being disposed between each first, second and third blades of the shift control valve and each first second and third blades of the manual valve; the shift control valve further including a fourth blade for selectively opening or closing the first, second, third and fourth speed ports of said body valve; and the shift control valve further including a horizontal passage and a plurality of vertical passages to supply the hydraulic pressure between the blades of the shift control valve and the blades of the manual valve.

Further scope of applicability of the present invention will become apparent from the detailed description given hereinafter. However, it should be understood that the detailed description and specific examples, while indication preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
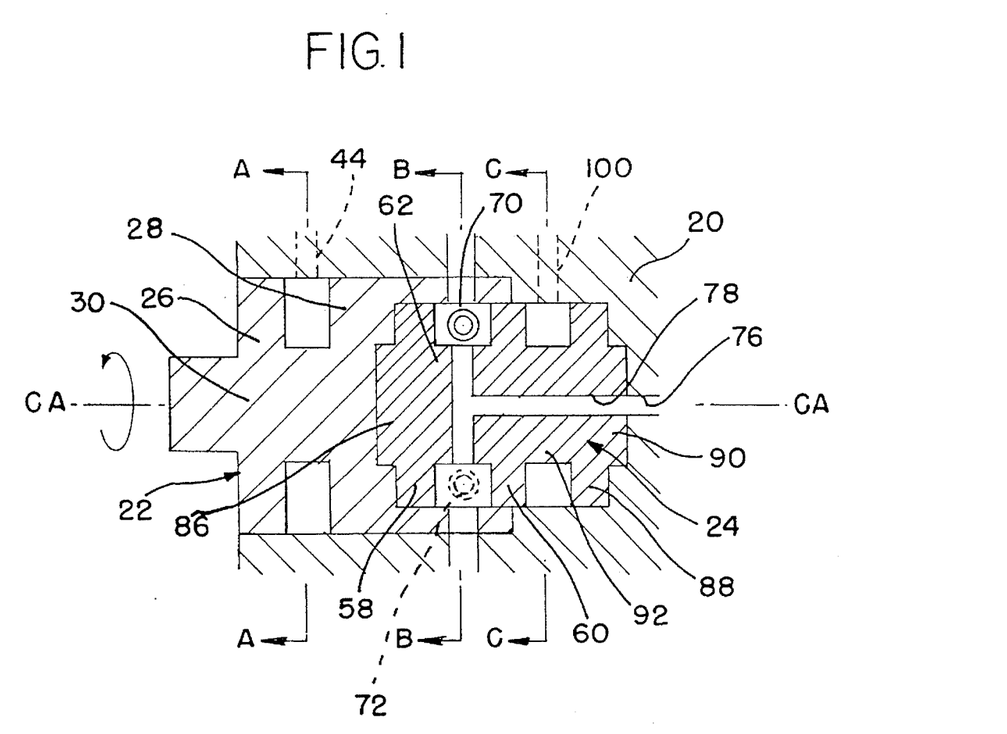
FIG. 1 is a side sectional view showing a shift valve according to the present invention.
Figure 2:
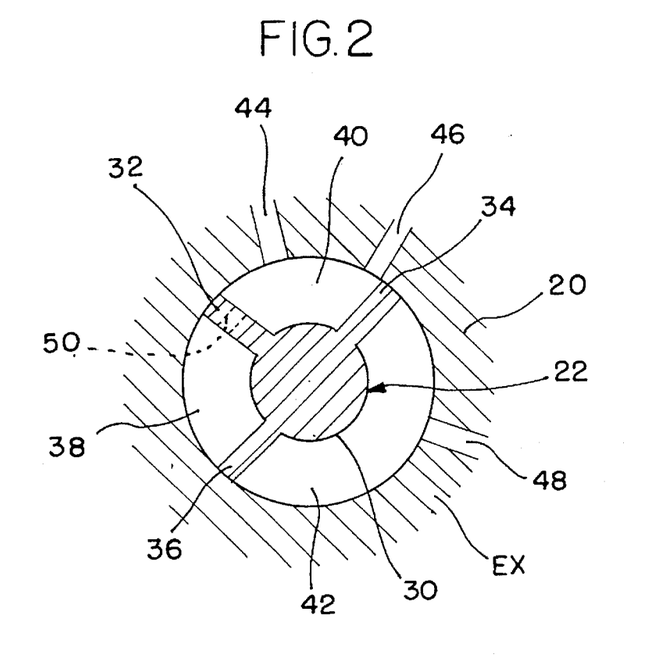
FIG. 2 is a sectional view taken along line A—A of FIG. 1.

Referring to FIGS. 1 and 2, a manual valve 22 and a shift control valve 24 are rotatably arranged at a concentric axis line CD in a valve body 20.

The manual valve 22 is connected with a shift lever(not shown) by a mechanical linkage and rotates in accordance with a movement of the shift lever.

An elastic members 70, 72 and (not shown) are disposed between the shift control valve 24 and the manual valve 22.

The manual valve 22 includes a first land 26 and a second land 28. A first, a second and a third blades 32, 34 and 36 are integrally formed in a predetermined angle on an neck portion 30 between the first and second lands 26, 28. A first, a second and a third chambers 38, 40, 42 are formed between the blades 32, 34 and 36, respectively.

The first, second and third chambers are substantially closed by a valve body 20. However, each chamber communicates, in accordance with a position of the blades, with a line pressure inlet port 44, a line pressure outlet port 46, a reverse pressure port 48 and an exhaust port EX all of which are formed on the valve body 20. The line pressure inlet port 44 communicates with the line pressure outlet port 46 in accordance with a rotation of the manual valve 22.

A passage 50 is provided at the first blade 32 to communicate the line pressure inlet port 44 with the reverse pressure port 48 in accordance with a rotation of the manual valve 22.

When the first blade 32 is moved toward an opposite position to the line pressure port 46, a hydraulic pressure, flowed into the line pressure inlet port 44, is supplied to the reverse pressure port 48 via the passage 50.

Referring to FIG. 1 and FIGS. 3A to 3C, a fourth, a fifth and a sixth blades 52, 54 and 56 are integrally formed with the second land 28 of the manual valve 22 disposed in the body valve 20 and extends in a radial direction. The manual valve 28 forms exhaust ports EX thereon.

A first and a second lands 58, 60 of the shift control valve 24 are rotatably disposed at the in side of the second land 28 of the manual valve 22. A neck portion 62 is formed between the first and second lands 58, 60 (see FIG. 1).

A first, a second and a third blades 64, 66 and 68 are integrally formed on the neck portion 62 of the shift control valve 24. Elastic members 70, 72, 74 are disposed between each blade 64, 66 and 68 formed of the neck portion 62 of the shift control valve 24 and each blade 52, 54, 56 formed on the second land 28 of the manual valve 22, respectively.

The exhaust valves EX formed on the second land 28 of the manual valve 22 communicate with the exhaust valve EX formed on the valve body 20.

The shift control valve 24 further includes an axial passage 78 which communicates with a detected pressure inlet port 76 formed on the valve body 20 (see FIG. 1). As shown in FIGS. 3A to 3D, the axial passage 78 communicates with radial passages 80, 82 and 84 so that the detected pressure is supplied to regions A, B and C.

The detected pressures supplied to the regions A, B and C work on the blades 52, 54 and 58 of the manual valve 22 and the blades 64, 66 and 68 of the shift control valve 24, at this point, since the manual valve is designed to move by only the shift lever, it does not rotate by the detected pressure flowed therein.

Accordingly, only the shift control valve 24 is designed to rotate. Therefore, in order to rotate the shift control valve, a boss 86 is integrally formed on a side end of the first land 58, and the boss 86 is rotatably disposed on the second land 28 of the manual valve 22. In this manner, another boss 90 is integrally formed on the third land 88 of the shift control valve 24, and the boss 90 is rotatably disposed on the valve body 20.

Referring to FIGS. 4A to 4D, a fourth, a fifth and a sixth blades 94, 96 and 98 are integrally formed on a neck portion 92 between the second and third lands 60 and 88 of the shift control valve 24 so as to open and close a first, a second, a third and a fourth speed ports 100, 102, 104 and 106 in order.

Figure 5:
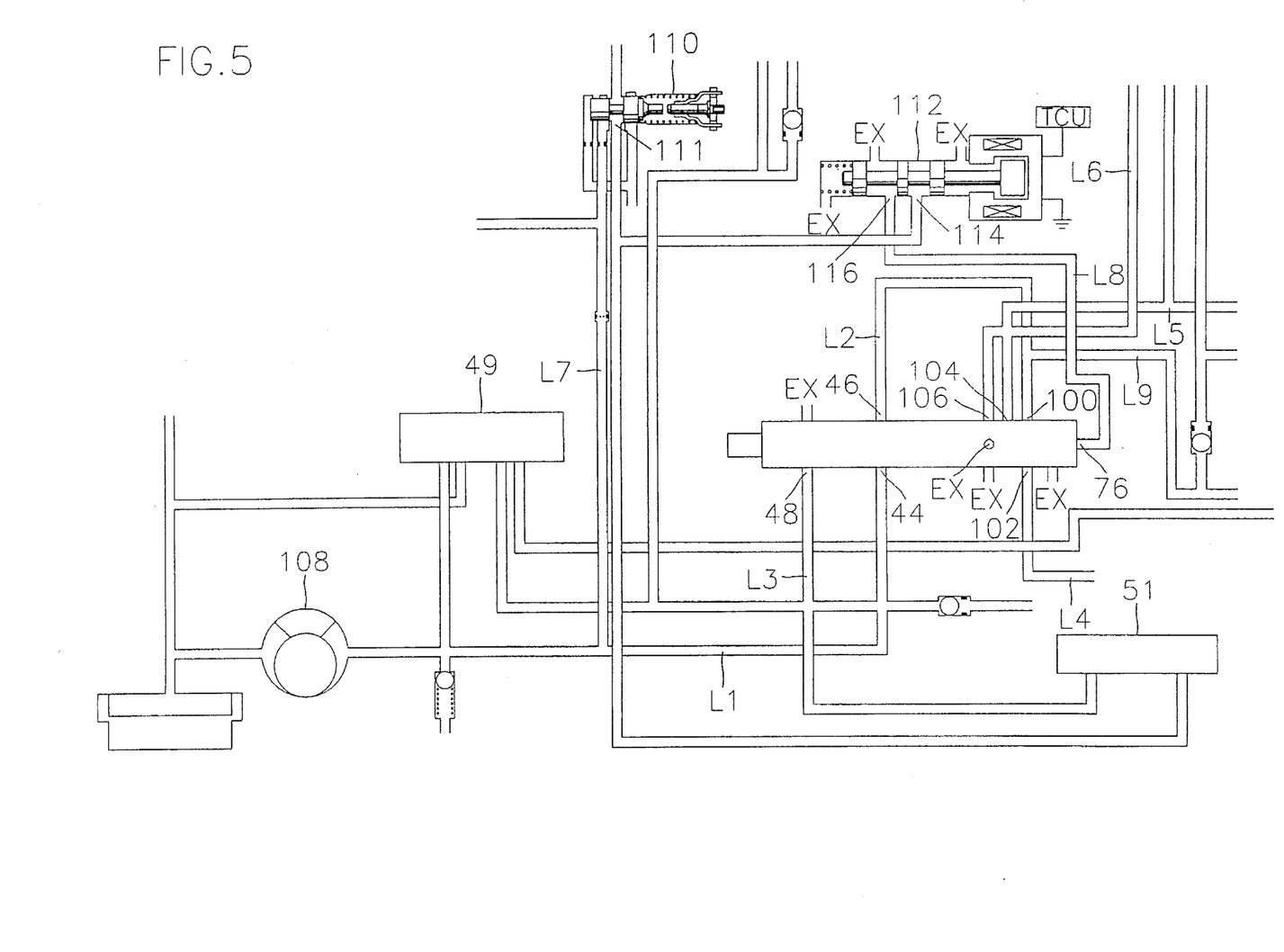
FIG. 5 is a schematic diagram of a hydraulic control system showing that a shift valve of the present invention is equipped.

Referring to FIG. 5, The hydraulic pressure generated from a fluid pump 108 is designed to be supplied to the line pressure inlet port 44 of the valve body 20 via a line pressure line L1.

A line pressure outlet port 46 is designed to communicate with the first speed port 100 of the valve body 20 via a drive pressure line L2.

The reverse pressure port 48 is connected at its left side (in the drawing) with a regulator valve 49 and at its right side (in the drawing) with an N–R control valve 51 which prevents a shift-impact when shifted from an "N" range to an "R" range, through a reverse pressure line L3.

The second speed port 102 is connected with a 1st–2nd speed shift valve(not shown) and an end clutch valve(not shown), and the third speed port 104 is connected with a 2nd–3rd/4th–3rd speed shift valve(not shown). Further, the fourth speed port 106 is connected with a rear clutch exhaust valve(not shown) via third and fourth speed lines L5, L6.

Further, the inlet port 76 of the valve body 20 is connected with a proportional control valve 112 which controls the hydraulic pressure of a reducing-pressure line L7 connected with an outlet port 111 of reducing valve 110 which controls the hydraulic pressure generated from the fluid pump 108 to be a lower pressure than that of the line-pressure.

The proportional control valve 112 includes a first port 114 connected with the reducing-pressure line L7 and a second port 116 connected with the inlet port 76 of the valve body 20 via a detected-pressure line L8. This proportional control valve is a type of valve described in U.S. Pat. No. 5,005,444.

In the hydraulic control system, as described above, the hydraulic pressure generated from the fluid pump flows into the line pressure inlet port 44, and this hydraulic pressure is selectively supplied to the line pressure outlet port 46 in accordance with a position of the manual valve 22. Further, this hydraulic pressure supplied to the line pressure outlet port 46 also selectively flows into the first speed port 100, at this point, the shift control valve 24 is controlled.

That is, in the "N" range, the first speed port 100 closes by the fourth blade 94 of the shift control valve 24, and in the "R" range opens in accordance with a working which will be described below.

That is, the hydraulic pressure generated from the fluid pump 108 is reduced at the reducing valve 110 and flows into the reducing pressure line L7. When a portion of this reduced hydraulic pressure flows into the second port 116 through the first port 114 of the proportional control valve 112, the opening area of the second port 116 of the proportional control valve 112 is changed by the control of a transmission control unit TCU thereby controlling the detected pressure which flows into the inlet port 76 of valve body 20.

In the embodiment of the present invention, a highest detected pressure is generated at the first speed stage of the "D" range, and the highest detected pressure is gradually reduced at the second, third and fourth speed stages in order.

Figure 3A:
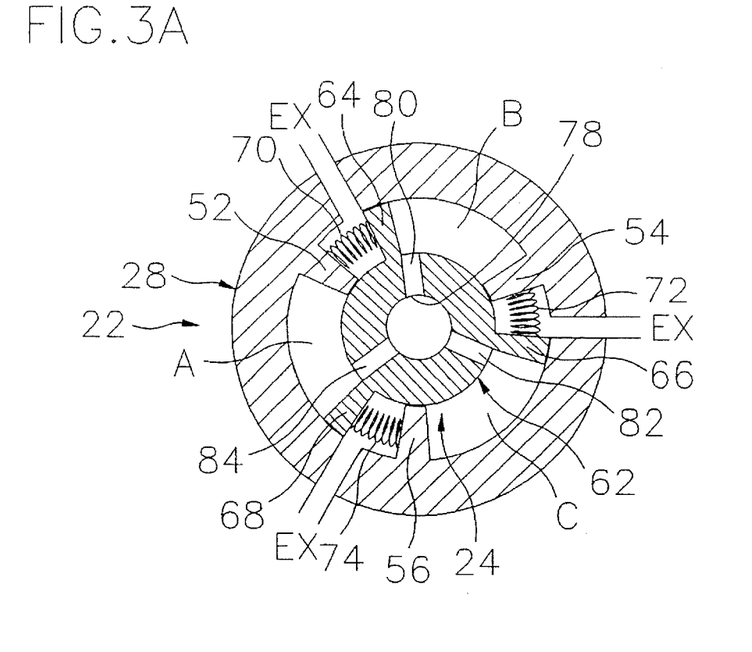
FIG. 3A is a sectional view taken along line B—B of FIG. 1 for depicting a location of a valve spool in a state of a first-speed stage.
Figure 4A:
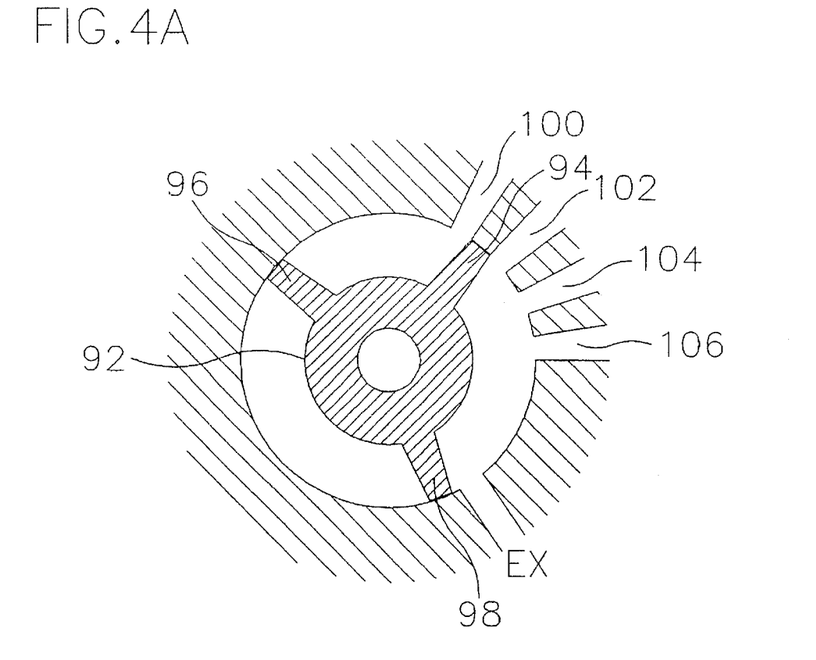
FIG. 4A is a sectional view taken along line C—C of FIG. 1 for depicting a location of a valve spool in a state of a first-speed stage.

Accordingly as shown in FIGS. 3A and 4A, in the first speed stage of the "D" range, the highest detected pressure flows into the inlet port 76 of the valve body 20, and this detected pressure is supplied to the radial passages 80, 82 and 84 through the axial passage 78 of the shift control valve 24.

At this point, the hydraulic pressure from the radial passages 80, 82, 84 is supplied to the regions A, B and C, and at the same time, the hydraulic pressure is formed between the fourth blade 52 of the manual valve 22 and the third blade 68 of the shift control valve 24, the fifth blade 54 of the manual valve 22 and the first blade 64 of the shift control valve 24, and the sixth blade 56 of the manual valve 22 and the second blade 66 of the shift control valve 24.

Accordingly, the first, second and third blades 64, 66 and 68 of the shift control valve 24 rotate counter-clockwise in the drawing in a state where the manual valve is maintained at the "D" range.

The blades 64, 66 and 68 compress the elastic members 70, 72, 74, respectively, until almost closing the exhaust port Ex formed on the manual valve 22 while they rotate as shown in FIG. 3A.

At this point, since the blades 64, 66 and 68 are integrally formed with the neck portion 62, the neck portion 62 rotates in accordance with the rotation of the blades 64, 66 and 68. And also, since the neck portion 62 is integrally formed with the neck portion 92, the neck portion 92 co-rotates with the neck portion 62.

Accordingly, the neck portion 92 rotates in the same angle of rotation with that of the neck portion 62, and, at this point, the fourth blade 94 of the shift control valve 24 is located between the first speed port 100 and the second speed port 102 as shown in FIG. 4A.

Accordingly, the first speed port 100 is designed to open, and since the second, third and fourth speed ports 102, 104, 106 are in a state of being shout off with the first speed port 100, the hydraulic pressure is supplied to a rear clutch (not shown) through a line L9 thereby achieving the first speed stage.

When the vehicle speed at the state of the first speed stage is gradually increased, the proportional control valve 112 controlled by the TCU supplies the hydraulic pressure lower than that of the first speed stage to the second port 116.

In this state, since the hydraulic pressure from the radial passages 80, 82 and 84 is designed to be lower than a status of the first speed stage, the rotation angle of the shift control valve is designed to be smaller than that of the first speed stage.

Figure 3B:
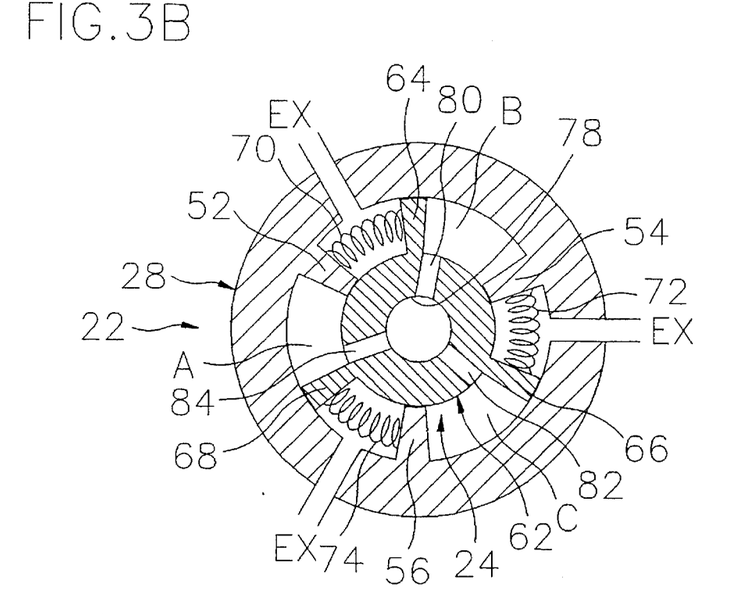
FIG. 3B is a sectional view taken along line B—B of FIG. 1 for depicting a location of the valve spool in a state of a second-speed stage.

Accordingly, the expansion of the elastic members 70, 72 and 74 is designed to be slightly larger than that of the first speed stage. The shift control valve in the state of the first speed stage slightly rotates clockwise in the drawing as shown in FIG. 3B.

Figure 4B:
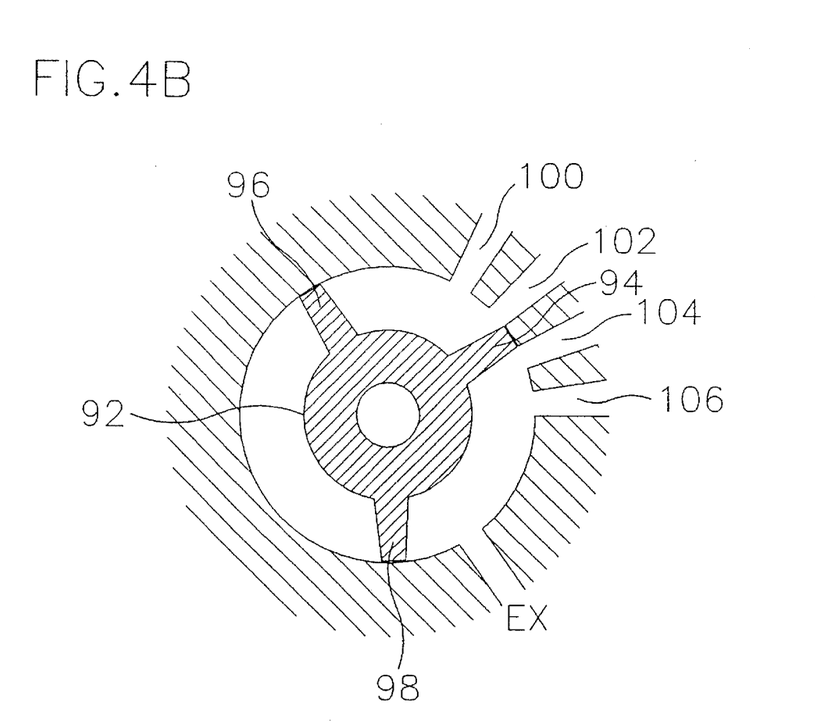
FIG. 4B is a sectional view taken along line C—C of FIG. 1 for depicting a location of the valve spool in a state of a second-speed stage.

By the above operation, the first blade 94 of the shift control valve 24 is located between the second speed port 102 and the third speed port 104, thereby communicating the first speed port 100 and the second speed port 102 with each other, as shown in FIG. 4B.

Accordingly, the hydraulic pressure from the first speed port 100 flows into the second speed port 102 and is supplied to the 1st–2nd shift valve(not shown) and the end clutch valve(not shown) through the second speed line L4, thereby realizing the second speed stage.

When the vehicle speed at the state of the second speed stage is gradually increased, the proportional control valve 112 controlled by the TCU supplies the hydraulic pressure lower than that of the second speed stage to the second port 116. The hydraulic pressure is supplied to the regions A, B and C through the radial passage 80, 82 and 84, in the same manner with the statue of the first and second speed stages.

Figure 3C:
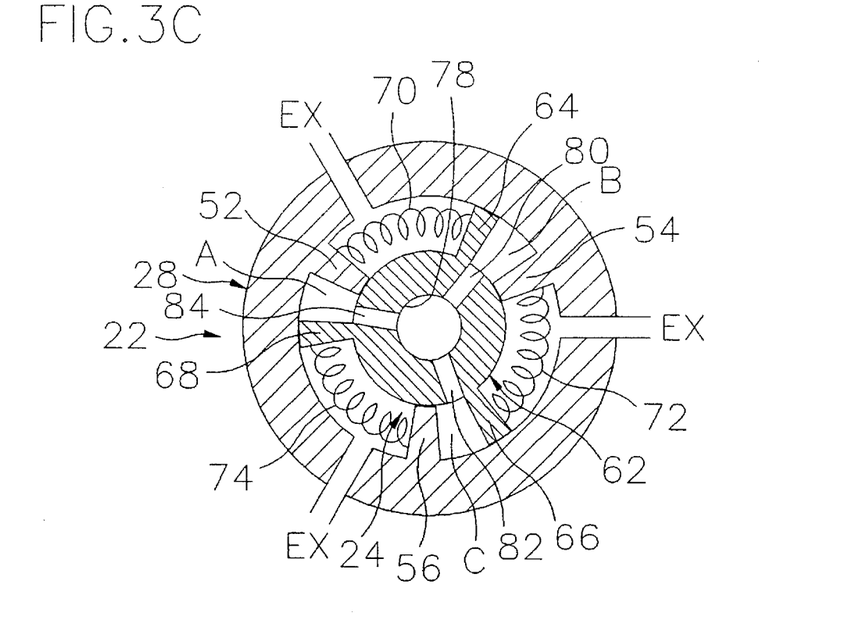
FIG. 3C is a sectional view taken along line B—B of FIG. 1 for depicting a location of the valve spool in a state of a third-speed stage.

In this state, the hydraulic pressures supplied to the regions A, B and C work on the first, second and third blades 64, 66 and 68 of the shift control valve 24, respectively, and since the hydraulic pressure is lower than that of the second speed stage, the shift control valve in the state of the second speed stage slightly rotates clockwise in the drawing by elastic force of the elastic members 70, 72 and 74, as shown in FIG. 3C.

Figure 4C:
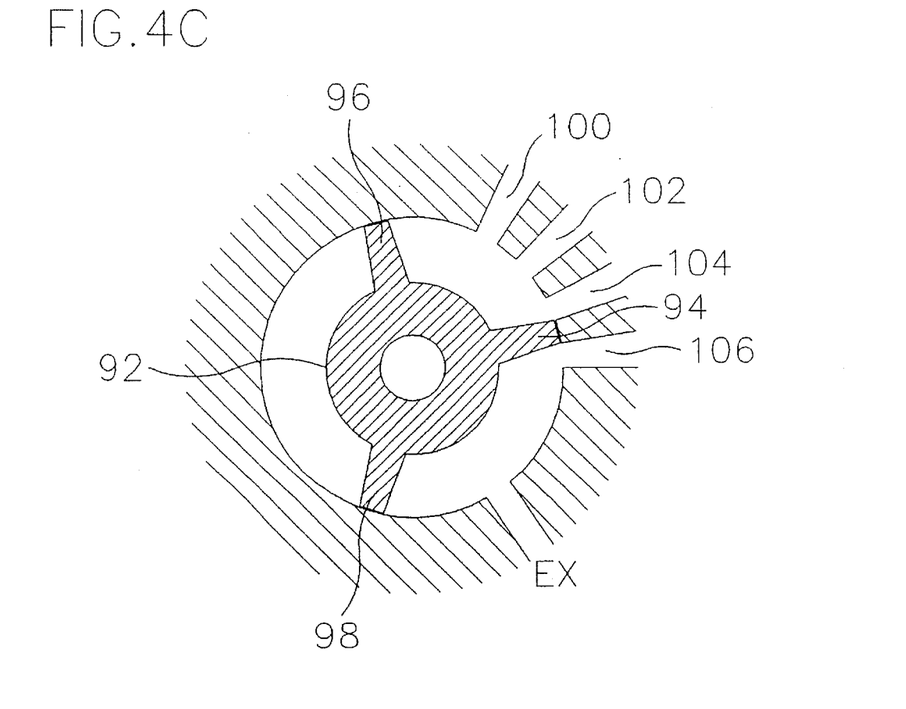
FIG. 4C is a sectional view taken along line C—C of FIG. 1 for depicting a location of the valve spool in a state of a third-speed stage.

By the above operation, the fourth blade 94 of the shift control valve 24 is located between the third speed port 104 and the fourth speed port 106, thereby communicating the first speed port 100 with the second speed port 102 and the third speed port 104, as shown in FIG. 4C.

Accordingly, the hydraulic pressure from the first speed port 100 flows into the second and third speed ports 102, 104 and is supplied to the 2nd–3rd/4th–3rd shift valve(not shown) and the end clutch valve(not shown) through the second speed line L4, thereby achieving the third speed stage.

When the vehicle speed at the state of third speed stage is gradually increased, the proportional control valve 112 controlled by the TCU supplies a lowest hydraulic pressure to the second port 116.

Figure 3D:
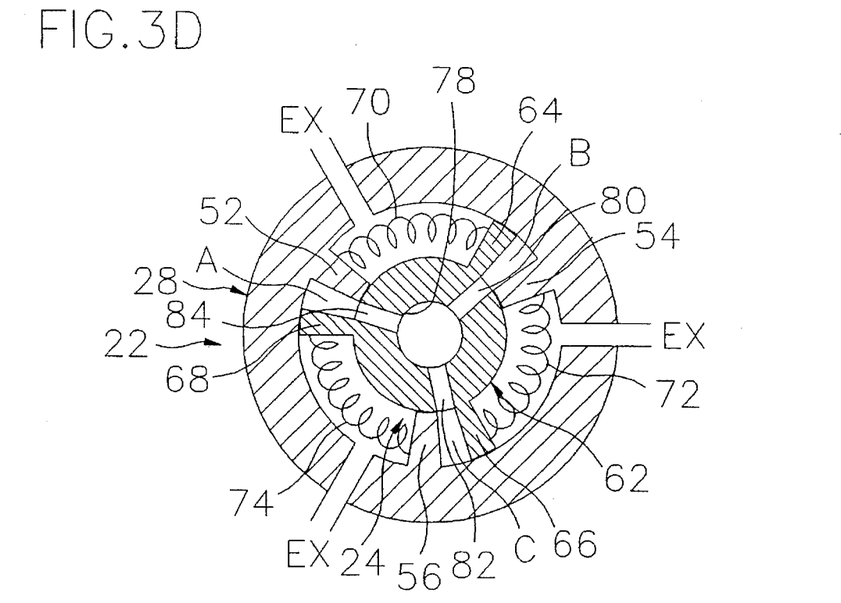
FIG. 3D is a sectional view taken along line B—B of FIG. 1 for depicting a location of the valve spool in a state of a fourth-speed stage.

The lowest hydraulic pressure is supplied to the regions A, B and C through the vertical passages 80, 82 and 84 of the shift control valve 24, respectively. In this state, since the hydraulic pressures supplied to the regions are lower than that of the third speed stage, the first blade 64 of the shift control valve 24 contact the fifth blade 54 of the manual valve 22 by the elastic force of the elastic members 70, 72 and 74, and the second blade 66 of the shift control valve 22 contacts the sixth blade 56 of the manual valve 22. Further, the third blade 68 of the shift control valve 24 contacts the fourth blade 52 of the manual valve 22, as shown in FIG. 3D.

At this point, the elastic members 70, 72 and 74 have a largest expansion measure.

Figure 4D:
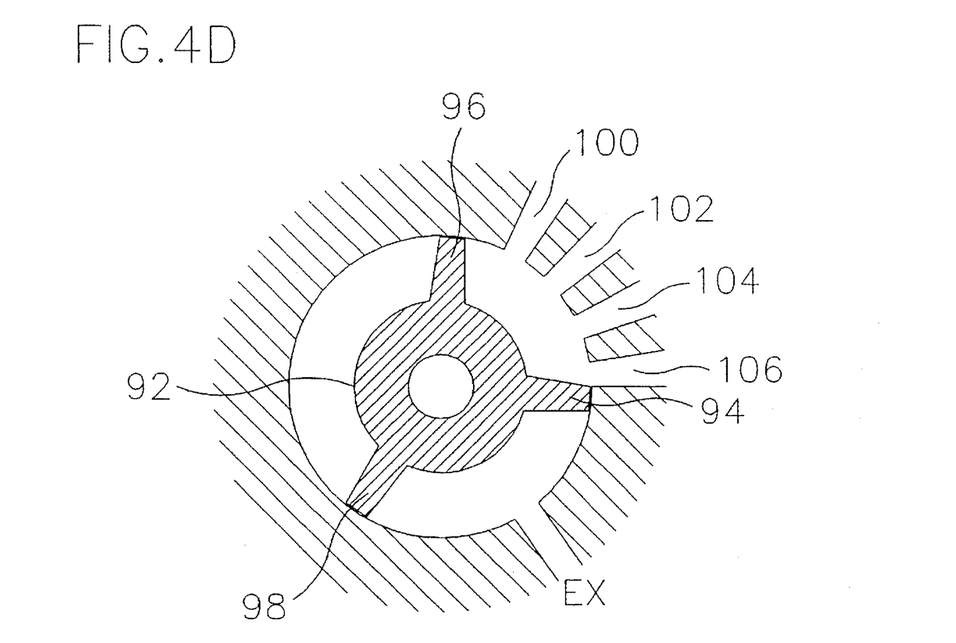
FIG. 4D is a sectional view taken along line C—C of FIG. 1 for depicting a location of the valve spool in a state of a fourth-speed stage.

By the above operation, the fourth blade 94 of the shift control valve 24 is located in a position passing the fourth speed port 106 as shown in FIG. 4D, such that the hydraulic pressure from the first speed port 100 flows into the second, third, fourth speed ports 102, 104 and 106 thereby realizing the fourth speed stage.

Further, when the shift lever is selected to the "R" range, from the state of FIG. 2, the first blade 32 of the manual valve 22 closes the line pressure outlet port 46 of the valve body 20.

And then, the hydraulic pressure generated from the fluid pump 108 flows into the line pressure inlet port 44, and flows out to the reverse pressure port 48 through the passage 50 formed on the first blade 32 of the manual valve 22.

The hydraulic pressure flowing out to the reverse pressure port 48 flows along the reverse pressure line L3, and at the same time, is supplied to the regulator valve, N–R valve and low/reverse brake, thereby realizing the reverse.

Further, when the electronic control system is out of order, if the shift lever is manually selected for the second blade of the manual valve 22 to be disposed at the "1", "2", "3", "D", "N", "R", or "P" positions, the same operation as the automatic transmission is realized, thereby increasing the safety.

The invention being thus described, it will be obvious that the same may be varied in many ways. Such variation are not to be regarded as a departure from the spirit and scope of the invention, and all such modifications as would be obvious to one skilled in the art are intended to be included within the scope of the following claims.

What is claimed is:

1. A hydraulic control system for an automatic transmission, the system comprising:
    a fluid pump;
    a proportional control valve for reducing a hydraulic pressure in accordance with a vehicle speed;
    a valve body comprising:
        a line pressure inlet port for receiving the hydraulic pressure compressed by said fluid pump;
        a line pressure outlet port for flowing out the hydraulic pressure to be used as a driving pressure in a "D" range;
        a reverse pressure port for flowing out the hydraulic pressure to be used as the driving pressure in an "R" range; and
        a first, a second, a third and a fourth speed ports for receiving the hydraulic pressure from said line pressure outlet port and for flowing out the hydraulic pressure to shift a speed stage in accordance with a vehicle speed;
    a manual valve rotatably disposed in said valve body and rotates in accordance with a movement of a shift lever; and
    a shift control valve rotatably disposed in a same concentric axis with said manual valve in said valve body;
    said manual valve including a neck portion, the neck portion integrally forming a first, a second and a third blades thereon for selectively supplying the line pressure to the line pressure inlet port, the line pressure outlet port, and the reverse pressure port;

said manual valve further including a fourth, a fifth, and a sixth blade;

said shift control valve including a first, a second and a third blades, elastic members being disposed between each first, second and third blades of said shift control valve and each fourth, fifth and sixth blades of the manual valve;

said shift control valve further including a fourth blade for selectively opening or closing the first, second, third and fourth speed ports of said valve body; and said shift control valve further including an axial passage and a plurality of radial passages to supply the hydraulic pressure between the first, second and third blades of the shift control valve and the fourth, fifth and sixth blades of the manual valve.

2. The system of claim 1, wherein the hydraulic pressure supplied to the horizontal passage of the shift control valve is controlled to be a highest hydraulic pressure at the first speed stage and to be gradually reduced at the second, third, fourth speed stages in order by the proportional control valve.

3. The system of claim 1, wherein the first blade of the manual valve forms a passage thereon to supply the line pressure to the reverse pressure port in the "R" range.

4. The system of claim 1, wherein the manual valve rotates in accordance with a position of the shift lever, and the shift control valve rotates in accordance with a detected pressure of the proportional control valve.

5. The system of claim 1, wherein the shift control valve rotates in accordance with the rotation of the manual valve when an electronic control system is out of order, thereby realizing a manual shift.

6. The system of claim 1, wherein the hydraulic pressure is supplied from the first speed port to the second speed port in the second speed stage of the "D" range, to the third speed port in the third speed stage of the "D" range and to the fourth speed port in the fourth speed stage of the "D" range.

7. The system of claim 1, wherein the shift control valve further comprises a boss formed on its one side to be rotatably located at the manual valve, and another boss formed on its another side to be rotatably located at the valve body.

* * * * *